(12) United States Patent
Kruglick

(10) Patent No.: US 9,207,963 B2
(45) Date of Patent: Dec. 8, 2015

(54) PREVENTING CLOUD CARTOGRAPHY

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 552 days.

(21) Appl. No.: 13/634,448

(22) PCT Filed: Feb. 1, 2012

(86) PCT No.: PCT/US2012/023421
§ 371 (c)(1),
(2), (4) Date: Sep. 12, 2012

(87) PCT Pub. No.: WO2013/115811
PCT Pub. Date: Aug. 8, 2013

(65) Prior Publication Data
US 2013/0198746 A1    Aug. 1, 2013

(51) Int. Cl.
G06F 9/455 (2006.01)
G06F 21/14 (2013.01)
G06F 21/56 (2013.01)

(52) U.S. Cl.
CPC ............ *G06F 9/45558* (2013.01); *G06F 21/14* (2013.01); *G06F 21/566* (2013.01); *G06F 2009/45595* (2013.01)

(58) Field of Classification Search
None
See application file for complete search history.

(56) References Cited

U.S. PATENT DOCUMENTS

| 7,886,038 | B2 | 2/2011 | Ferris |
| 7,996,675 | B2 | 8/2011 | Nikander |
| 2002/0157020 | A1 | 10/2002 | Royer |
| 2009/0044274 | A1 | 2/2009 | Budko et al. |
| 2011/0141124 | A1 | 6/2011 | Halls et al. |
| 2011/0185082 | A1 | 7/2011 | Thompson |
| 2011/0258692 | A1 | 10/2011 | Morrison et al. |

OTHER PUBLICATIONS

International Search Report and Written Opinion for PCT/US2012/923421 Filed Feb. 1, 2012, mailed May 30, 2012.
Ristenpart et al. Hey, you, get off of my cloud. exploring information leakage in third-party compute clouds. Proceedings of the 16th ACM conference on computer and communications security. Nov. 2009. [retrieved on May 8, 2012]. Retrieved from ACM Digital Library: deilvery.acm.org/10.1145/1660000/1653687/p199-ristenpart.pdf?ip=151.207.250.51& id= 1653687 & acc= ACTIVE%20SERVICE&key=C15944E53D0ACA63%2E4D4702B0C3E38B35%2E4D4702B0C3E38B35%2E4D4702B0C3E38B35&CFID=702693684&CFTOKEN=35236150&_acm_=1439480346_56d993f0f82644e1f433bf54298a62de.
Vaquero et al, Locking the sky: a survey on IaaS cloud security. Received: Aug. 12, 2010 / Accepted: Nov. 2, 2010 / Published online: Nov. 24, 2010 © Springer-Verlag 2010.
Berger et al. vTPM: Virtualizing the Trusted Platform Module, IBM T. J. Watson Research Center Hawthorne. NY 10532 USA, Security '06: 15th USENIX Security Symposium.

(Continued)

*Primary Examiner* — Eric C Wai
(74) *Attorney, Agent, or Firm* — Turk IP Law, LLC

(57) ABSTRACT

Technologies are presented for a network/hypervisor approach to maintain a stable and separate network address for the hypervisor on a multi-tenant system and changeable network addresses for the virtual machines (VMs). In some examples, the VM addresses may be decoupled from the domain address for the hypervisor so they can be changed arbitrarily and independently without impacting command messaging, and the domain address for the hypervisor may not form a part of the delivery chain for messages to the VMs. The system may also consume only the same number of IP addresses as currently used.

19 Claims, 7 Drawing Sheets

(56) References Cited

OTHER PUBLICATIONS

Barham et al. Xen and the art of virtualization. SOSP'03: Proceedings of the nineteenth ACM symposium on Operating systems principles, 2003.

Nikander et al., "Host Identity Protocol (HIP): Connectivity, Mobility, Multi-Homing, Security, and Privacy over IPv4 and IPv6 Networks," IEEE Communications Surveys & Tutorials 12, No. 2 (2010): 186-204.)—See particular section bolded in the background.
International Preliminary Report on Patentability for PCT/US2012/023421 filed Feb. 1, 2012, mailed on Aug. 14, 2014, Issued Aug. 5, 2014.

PREVENTING CLOUD CARTOGRAPHY

CROSS-REFERENCE TO RELATED APPLICATION

This Application is the U.S. National Stage filing under 35 U.S.C §371 of PCT Application No. PCT/US12/23421 filed on Feb. 1, 2012. The PCT Application is herein incorporated by reference in its entirety.

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud-based datacenters that can enable access to computing resources at various levels. Cloud-based service providers may provide individuals and organizations with a range of solutions for systems deployment and operation. Customer data (and applications) may be stored in a server or one or more virtual datacenters distributed over multiple servers. While datacenters employ a number of security measures, attackers may attempt to gain access to customer data through various methods.

Side channel datacenter attack is one method to access customer data through cartography—systematic mapping of a datacenter and determination of how to get a task assigned in the vicinity of a target. Side channel attacks may also include target identification —recognizing when a malign task is co-located. And, side channel data extraction—reading meaning from parameters that can be read by a co-located task—may also be included in a side channel attack. If one or more of these steps is defeated, an attacker may be foiled.

Thus, mapping the internal cloud infrastructure, identifying where a particular target virtual machine (VM) is likely to reside, and then determining how to instantiate new VMs until one is placed co-resident with the target are called "cloud cartography"—the mapping of datacenter assignments in a physical hardware sense and finding ways to have a VM assigned to a target destination. Once the cloud cartography map is created, the likelihood of hitting co-residence with a target through instantiation may increase substantially.

SUMMARY

The present disclosure generally describes technologies for preventing cloud cartography in cloud-based datacenters.

According to some example embodiments, a method for preventing cloud cartography in cloud-based datacenters may include providing access to a plurality of virtual machines operable to be executed on one or more physical machines within a datacenter through a virtual machine monitor and decoupling addresses of the plurality of virtual machines from an address of the virtual machine monitor such that the address of the virtual machine monitor is excluded from a delivery chain of messages to the plurality of virtual machines.

According to other example embodiments, a cloud-based datacenter configured to prevent cloud cartography may include a plurality of virtual machines operable to be executed on one or more physical machines, a virtual machine monitor configured to provide access to the plurality of virtual machines, and a datacenter controller configured to decouple addresses of the plurality of virtual machines from an address of the virtual machine monitor such that the address of the virtual machine monitor is excluded from a delivery chain of messages to the plurality of virtual machines.

According to further example embodiments, a computer-readable storage medium may have instructions stored thereon for preventing cloud cartography in cloud-based datacenters. The instructions may include providing access to a plurality of virtual machines operable to be executed on one or more physical machines within a datacenter through a virtual machine monitor and decoupling addresses of the plurality of virtual machines from an address of the virtual machine monitor such that the address of the virtual machine monitor is excluded from a delivery chain of messages to the plurality of virtual machines.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
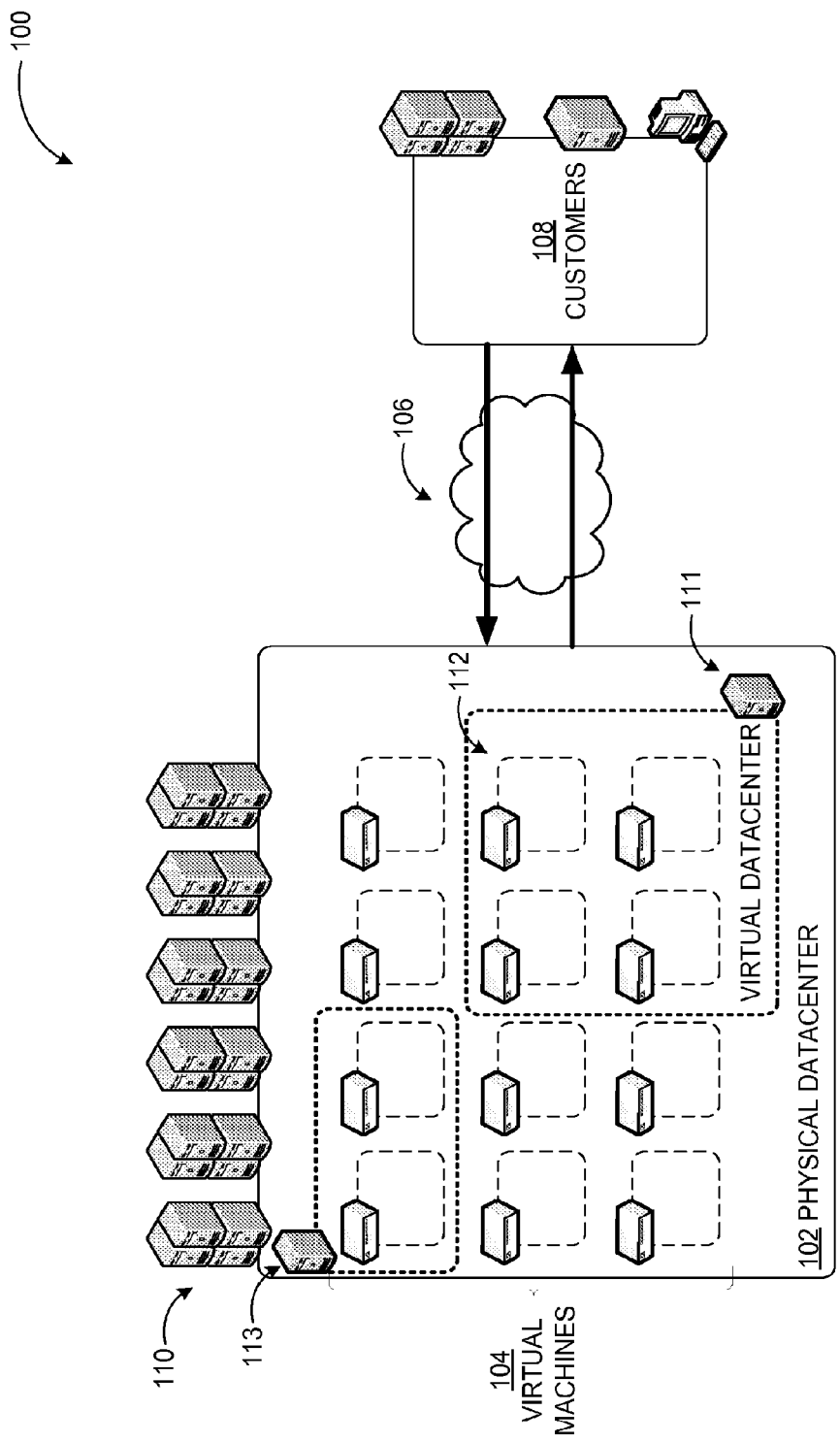
FIG. 1 illustrates an example system, where cloud cartography may be prevented.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to preventing cloud cartography in cloud-based datacenters.

Briefly stated, technologies are presented for a network/hypervisor approach to maintain a stable and separate network address for the hypervisor on a multi-tenant system and changeable network addresses for the virtual machines (VMs). The VM addresses may be decoupled from the domain address for the hypervisor such that the VM addresses can be changed arbitrarily and independently without impacting command messaging, and the domain address for the hypervisor may not form a part of the delivery chain for messages to the VMs. The system may also consume the same number of IP addresses as currently used.

FIG. 1 illustrates an example system, where cloud cartography may be prevented, arranged in accordance with at least some embodiments described herein.

As shown in a diagram 100 of FIG. 1, a service provider may host services such as various applications, data storage, data processing, or comparable ones for individual or enterprise customers 108 through one or more managed datacenters. A physical datacenter 102 may be provided by multiple servers 110. Data storage and application execution may be managed through multiple virtual machines 104 which may be established on each physical server (e.g., servers 111 and 113) in the physical datacenter 102. In some scenarios, one or more virtual datacenters such as a virtual datacenter 112 may be configured by grouping multiple virtual machines. Communications between the physical or virtual datacenters and the customers 108 may be facilitated over one or more networks 106.

While customer data may be stored in various physical machines in a datacenter, intruders may gain access to the customer data through side channel datacenter attacks using cartography by systematically mapping the datacenter and determining how to get a task assigned in the vicinity of a target. In a system according to some embodiments, a separate network address may be maintained for a virtual machine monitor providing access to the virtual machines and changeable network addresses for the virtual machines. The virtual machine addresses may be decoupled from the domain address for the virtual machine monitor so they can be changed arbitrarily and independently without impacting command messaging.

Figure 2:
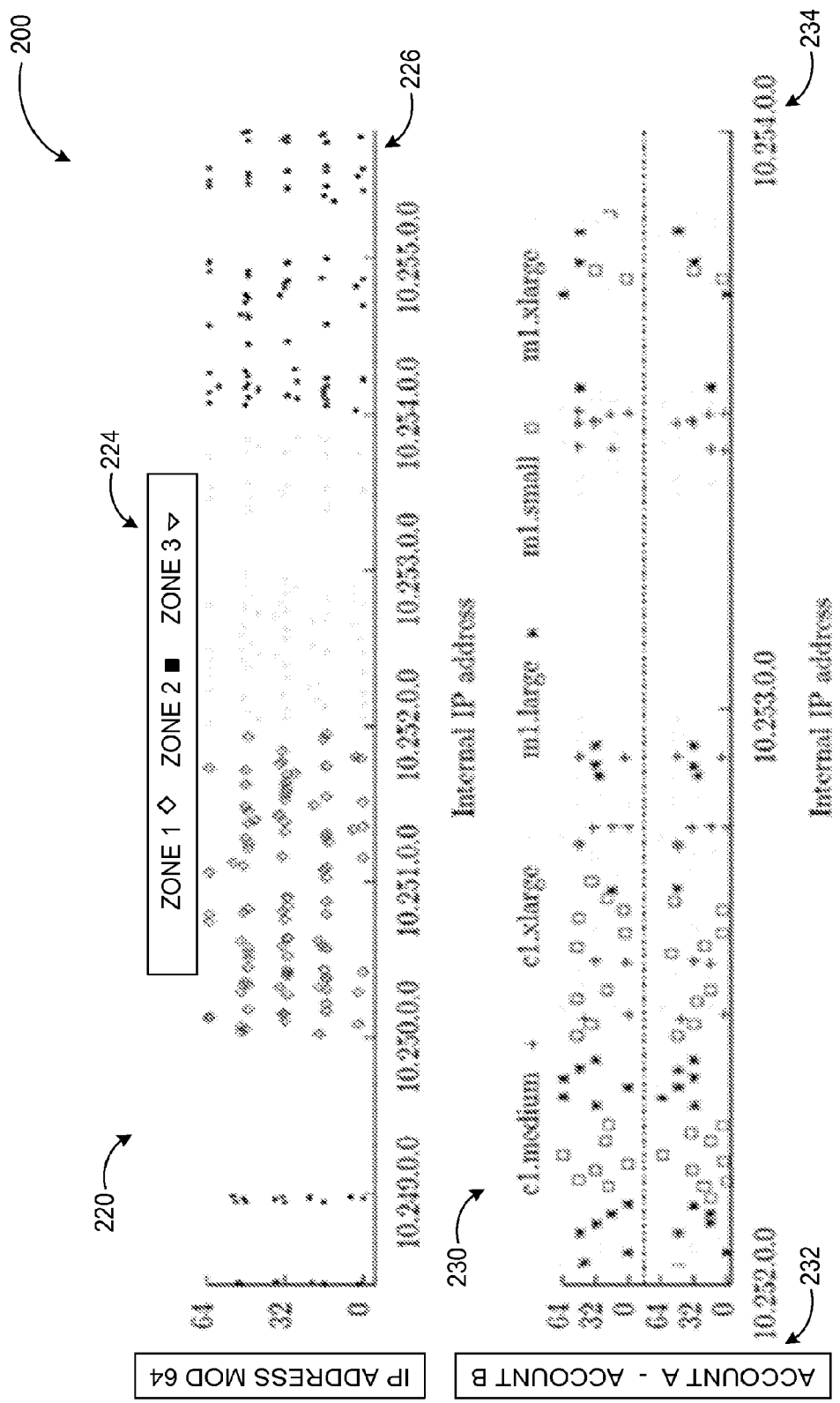
FIG. 2 illustrates a cloud cartography mapping of an example cloud-based datacenter.

FIG. 2 illustrates a cloud cartography mapping of an example cloud-based datacenter, arranged in accordance with at least some embodiments described herein.

As depicted in FIG. 2, a diagram 200 includes a graph 220 and a graph 230. The graph 220 shows IP addresses 226 assigned based on requested zones 224, illustrating that certain IP ranges are associated with certain zones. The graph 230 displays two different accounts 232 used to request instances 39 hours apart. Fifty-five of the account B management IP addresses 234 (mapped by the domain address of a virtual machine monitor) are repeats of those assigned to instances for account A indicating they are on the same physical machines. This shows that one account may be used to map the zone and physical machines associated with virtual machine monitor (hypervisor) IP ranges, that hypervisor IPs may then be back-converted into machine types, and that this information is static enough that one may later request a machine type and zone associated with the hypervisor IP address of a target and have a good chance of achieving co-residence with little expenditure. One possible reason behind this potential weakness may be the machine hypervisors having to have a single stable IP address (the Dom0 address) for management and that IP address being part of the network chain to reach any virtual machine on the associated hardware.

One primary weakness exploited by both cloud cartography and co-residence determination is the handling of the network connection at a virtual machine. The hypervisor (or the virtual machine monitor) may provide isolation between VMs, intermediating access to physical memory and devices. A privileged machine, called Domain0 (Dom0) may be used to manage guest images, their physical resource provisioning, and any access control rights. In some example implementations, the Dom0 VM may be configured to route packets for its guest images and may appear as a network hop. Even if the trace route reporting is eliminated, the Dom0 may be resolved in a variety of ways, for example, using time-to-live manipulations to explore the IP addresses along a path.

If the Dom0 IP address of the hypervisor is removed from the communication chain with each virtual machine, many of the methods used to demonstrate cloud cartography and co-residence may be eliminated. Additionally, if the IP addresses of the VMs are randomized, demonstrated cloud cartography techniques may be further eliminated, but it would have to be accomplished without requiring the system management address to change in order to avoid disruption of system management.

Figure 3:
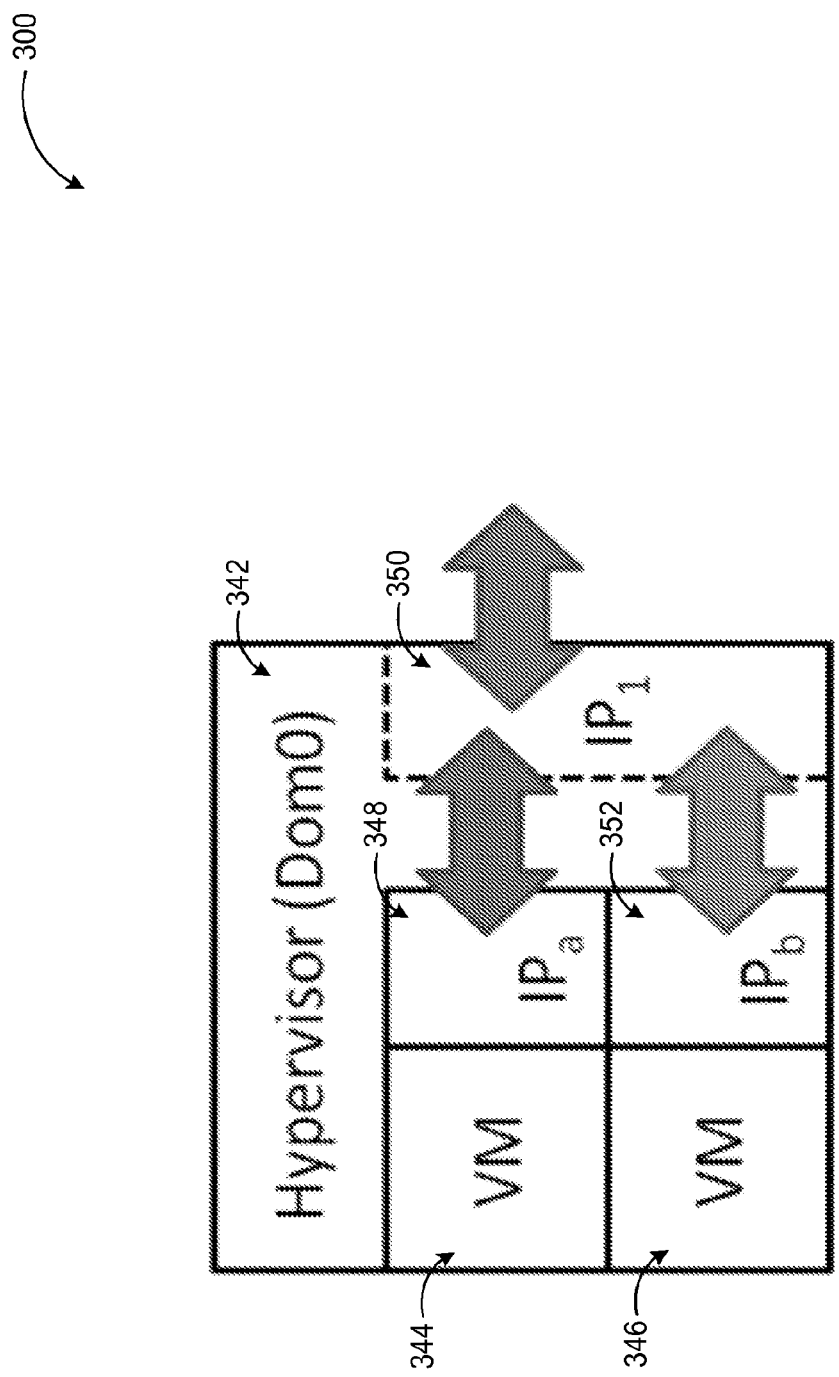
FIG. 3 illustrates an example network connectivity to virtual machines through a virtual machine monitor (hypervisor), where the hypervisor address is coupled to the virtual machine addresses.

FIG. 3 illustrates an example network connectivity to virtual machines through a virtual machine monitor (hypervisor), where the hypervisor address is coupled to the virtual machine addresses, arranged in accordance with at least some embodiments described herein.

As shown in FIG. 3, a diagram 300 illustrates a conventional implementation of network connectivity through a hypervisor 342 to virtual machines. The hypervisor 342 in the diagram 300 is Domain 0 (Dom 0) and has an address $IP_1$ 350. Each VM 344, 346 may receive an IP address (an $IP_a$ 348 and an $IP_b$ 352) and all three addresses are known to the cloud network and/or domain name server (DNS). The hypervisor 342 may provide network control and virtualization of access, so that traffic to and from the $IP_a$ 348 and the $IP_b$ 352 is allowed to pass through the $IP_1$ 350 before being delivered to the network as a single stream. This combination of IP addresses and their traceability by external systems is what causes Dom 0 to be a difficult to change and highly identifiable network hop, traits that make it a target for cloud cartography and co-residence testing.

One of the challenges with breaking the link between IP addresses and hardware in a datacenter is the administration difficulties. Varying hypervisor IPs may make administration, datacenter infrastructure management (DCIM), and general management harder to implement and more costly. The hypervisor may not be taken out of the connection path with the VM from the data center network, which means that the hypervisor IP may not be changed while any VM is running.

Some embodiments employ Host Identity Protocol (HIP), a standards-compliant IP interface that allows assigning multiple addresses to a single physical device. HIP allows multiple single system end-points (sockets) to have unique identifiers such as IPv4 and IPv6 addresses, which the network may treat alike (as both share the same topological location) with each having a full set of ports, security, and sessions.

The hypervisor may be altered to have a separate IP address for the Domain 0 (used for management) and for each VM. Thus, each VM may be assigned a different HIP IP address. As a result of this assignment, the network may see a different and known address for the hypervisor and each VM, and by using an architecture described below this assignment may be used to separate the hypervisor from the VMs. Meanwhile, each VM may still have a full set of ports and be indistinguishable from a normal connection.

Figure 4:
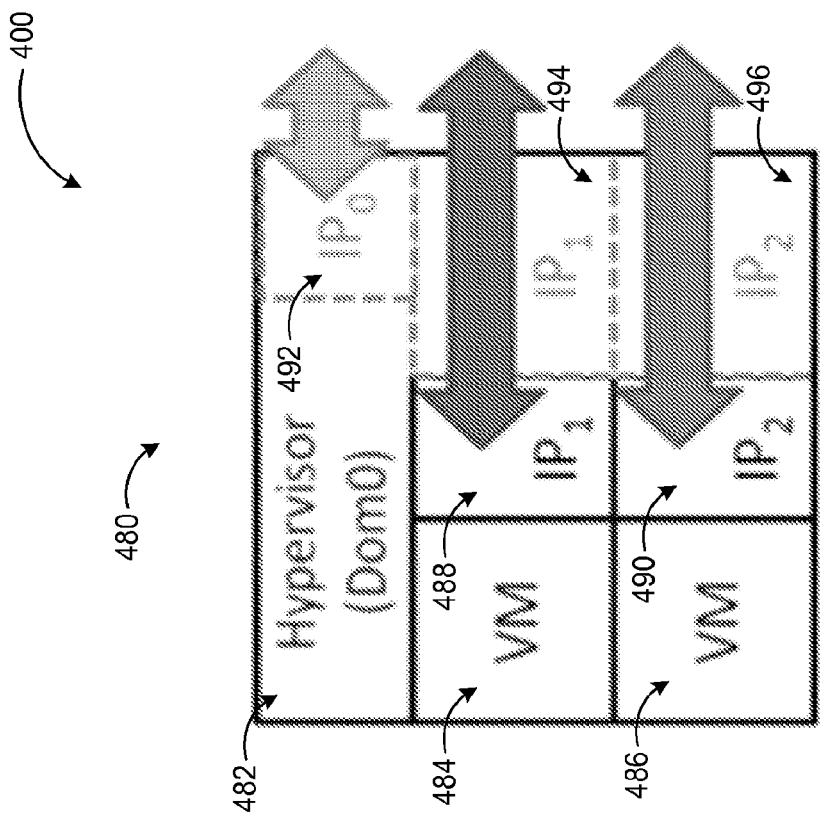
FIG. 4 illustrates example network connectivity implementations, where multiple addresses are employed by the hypervisor and a domain 0 address is decoupled from the addresses of the virtual machines.
Figure 4:
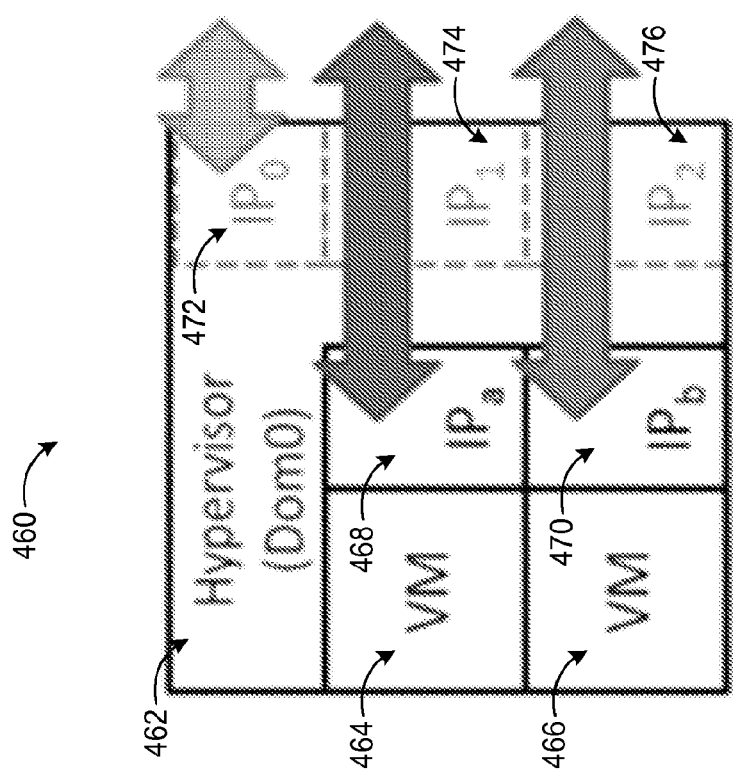

FIG. 4 illustrates example network connectivity implementations, where multiple addresses are employed by the hypervisor and a domain 0 address is decoupled from the addresses of the virtual machines, arranged in accordance with at least some embodiments described herein.

As shown in FIG. 4, a diagram 400 illustrates two alternative approaches according to at least some embodiments, where the HIP may be employed to assign Domain 0 multiple IP addresses. One of the addresses ($IP_0$) may be considered Dom 0 and used for management and communication with the hypervisor itself, while others ($IP_1$ and $IP_2$ for the two example VMs shown here, scalable to $IP_N$) may be assigned to each VM.

An example configuration 460 in the diagram 400 includes a hypervisor 462 having assigned an address $IP_0$ 472 and two VMs 464 and 466. According to some embodiments, any address at the hypervisor 462 with an index above the $IP_0$ 472 may be associated with an internal address. For example, an $IP_1$ 474 may be associated with an $IP_a$ 468 assigned to the VM 464. Similarly, an $IP_2$ 476 may be associated with an $IP_b$ 470 assigned to the VM 466. The hypervisor 462 may still show up as a hop on the way to the VMs, although that hop address may be random and different for each VM and may not provide a co-residence test or cartography tool.

An example configuration 480 in the diagram 400 includes a hypervisor 482 with similar HIP addresses ($IP_0$ 492, $IP_1$ 494, and $IP_2$ 496), where the non-hypervisor addresses are the same as the IP addresses $IP_1$ 488 and $IP_2$ 490 for VMs 484 and 486. Messages in the example configuration 480 may be passed via paravirtualized network drivers or other direct methods such as software simulated routing that delivers packets to sockets within each VM, unmoderated connections without Dom0 queuing, or any other method that allows reuse of IPs internally or does not require separate IP addresses. Thus, there is no network hop at the hypervisor interface and any address tracing attempt may end when the attempt reaches the IP addresses 494, 496, or the equivalent. The example configuration 480 may eliminate some detectable traits and conserve IP addresses down to the number used in conventional approaches described previously.

Both configurations may allow the VM IP addresses to be completely arbitrary and remove long lasting Dom 0 addresses from network paths, eliminating Dom 0 based network cartography and co-residence testing. This approach also enables the VM IP addresses to change independently of the hypervisor address allowing for stable management with VM IP freedom that can be used to implement counter-intelligence techniques to further impede malicious users.

The HIP usage may be entirely transparent to the applications and external access in some embodiments. The HIP may be used within the datacenter, starting at each hypervisor level and ending at the gateway boundary, and incurring no performance penalty as the HIP header extension may be stripped during existing processing by network processors already patrolling the boundary gateways of every datacenter.

As mentioned above, the HIP is an internetworking architecture and an associated set of protocols that enhances the original Internet architecture by adding a name space used between the IP layer and the transport protocols. The new name space may include cryptographic identifiers, thereby implementing the so-called identifier/locator split. In the HIP architecture, the identifiers may be used in naming application level endpoints (sockets), replacing the prior identification role of IP addresses in applications, sockets, TCP connections, and UDP-based send and receive system calls. HIP may be deployed such that no changes are needed in applications or routers allowing enhanced accountability through the cryptographic identifiers.

One approach according to some embodiments may include placing the hypervisor addresses in a dedicated range not accessible to normal traffic (not on the DNS, malformed, virtual networking, etc.), and then assigning each VM an address randomly upon creation. This may render conventional cartographic techniques impotent, but may also be easily recognized. For example, the plot of FIG. 2 may show a random distribution. This in turn may allow attackers to recognize the security strategy and save them time they might have wasted pursuing this mode of attack. A more pro-active security approach may include use of counter-intelligence principles and supplying attackers with plausible but wrong cartographic results. For example, each customer account may be associated with a table linking random addresses to different zones and instance sizes so that when a user requests an instance fitting such properties, the address may be drawn from the appropriate population on their table if possible. Each user may have a different table ensuring that individual attackers see results similar to FIG. 2, but that those results may actually be useless for attempts at manipulating instance placement and co-residency determinations may return false positives.

The above described approach may be defeated in turn by attackers double-checking data across many accounts. However, some embodiments may extend the method of assigning users different tables in order to thwart tracing attempts in other ways to morph the "apparent" network structure seen by various users in response to time and events. Another example may include modifying a structure seen by a user whose activities appear to indicate attempts at mapping the data center.

While example embodiments are described using IP addresses, virtual machines, and other datacenter aspects, embodiments are not limited to those. Example implementations may also employ other types of network addresses, datacenter elements, and so on using the principles described herein.

Figure 5:
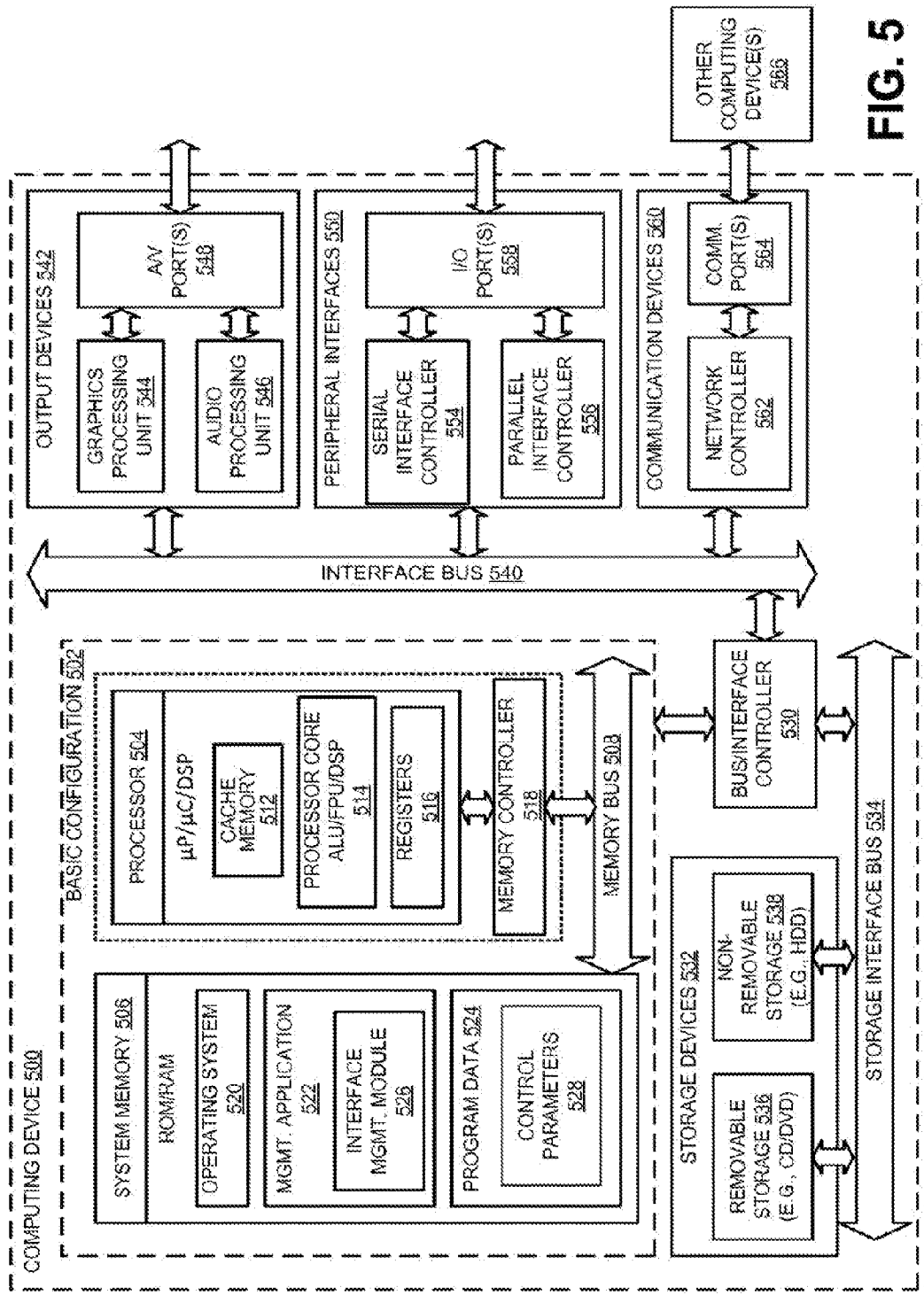
FIG. 5 illustrates a general purpose computing device, which may be used to implement prevention of cloud cartography in cloud-based datacenters.

FIG. 5 illustrates a general purpose computing device 500, which may be used to implement prevention of cloud cartography in cloud-based datacenters, arranged in accordance with at least some embodiments described herein. For example, the computing device 500 may be used as servers 110, 111, or 113 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The applications 522 may include a cloud management application, including an interface management module 526, which may employ hypervisor separation methods to prevent cloud cartography using HIP protocol adaptors as described herein. The program data 524 may include, among other data, control parameters 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 550, and one or more communication devices 560) to the basic configuration 502 via the bus/interface controller 530. Some of the example output devices 542 include a graphics processing unit 544 and an audio processing unit 546, which may be configured to communicate to various external devices such as a display or speakers via one or more A/V ports 548. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 566 over a network communication link via one or more communication ports 564. The one or more other computing devices 566 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for preventing cloud cartography in cloud-based datacenters. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
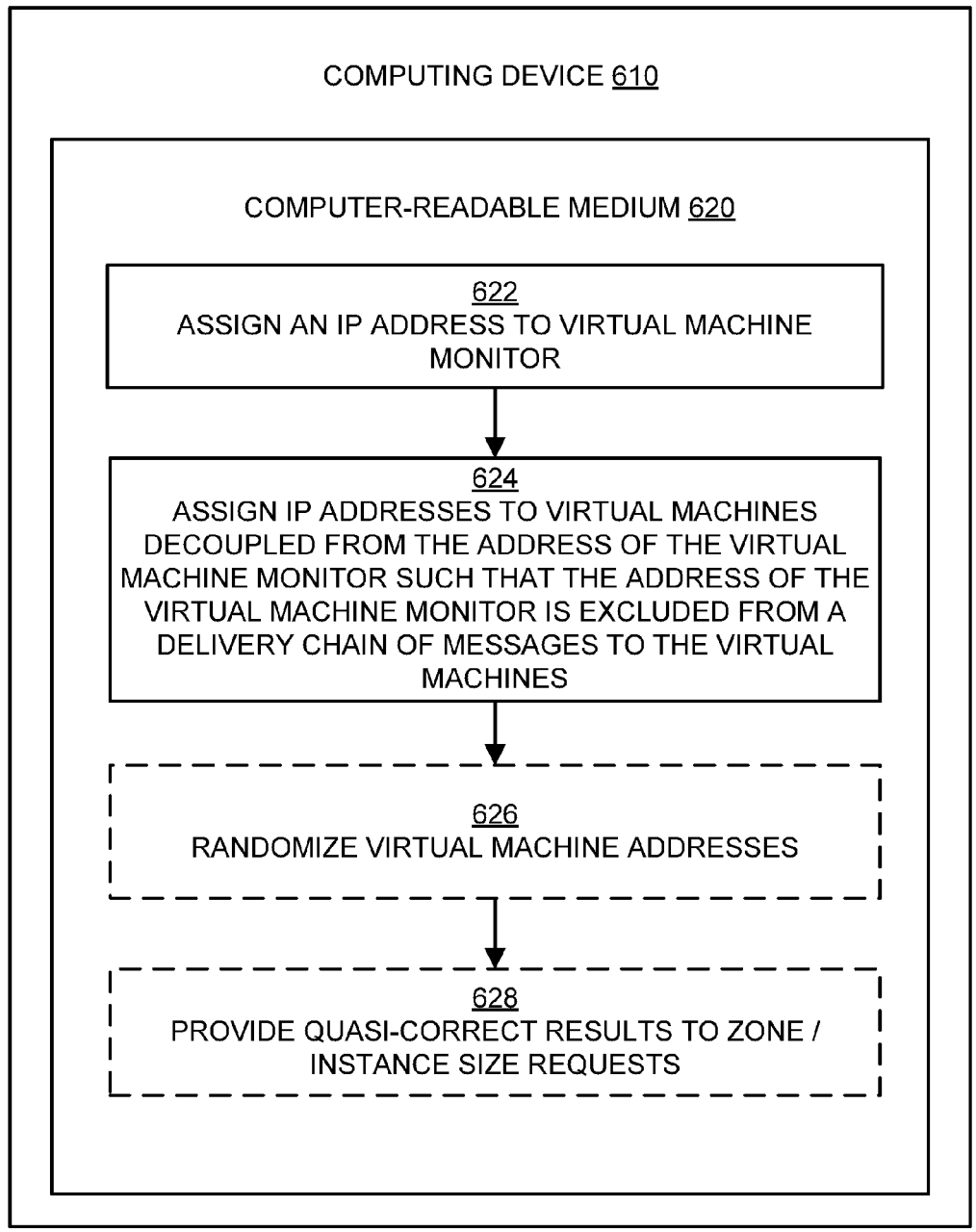
FIG. 6 is a flow diagram illustrating an example method that may be performed by a computing device such as device 500 in FIG. 5.

FIG. 6 is a flow diagram illustrating an example method that may be performed by a computing device such as the device 500 in FIG. 5, arranged in accordance with at least some embodiments described herein. Example methods may include one or more operations, functions or actions as illustrated by one or more of blocks 622, 624, 626, and/or 628. The operations described in the blocks 622 through 628 may also be stored as computer-executable instructions in a computer-readable medium such as a computer-readable medium 620 of a computing device 610.

An example process for preventing cloud cartography in cloud-based datacenters may begin with block 622, "ASSIGN AN IP ADDRESS TO VIRTUAL MACHINE MONITOR", where a network address that is not accessible to systems outside a datacenter such as $IP_0$ 472 of FIG. 4 may be assigned to a virtual machine monitor or hypervisor 462 of FIG. 4.

Block 622 may be followed by block 624, "ASSIGN IP ADDRESSES TO VIRTUAL MACHINES DECOUPLED FROM THE ADDRESS OF THE VIRTUAL MACHINE MONITOR SUCH THAT THE ADDRESS OF THE VIRTUAL MACHINE MONITOR IS EXCLUDED FROM A DELIVERY CHAIN OF MESSAGES TO THE VIRTUAL MACHINES", where network addresses may be assigned to virtual machines at the datacenter that are not related to the address of the virtual machine monitor (or hypervisor) such that the address of the virtual machine monitor is excluded from a delivery chain of messages to the virtual machines. Examples of such addresses may include $IP_a$ 468, $IP_b$ 470, $IP_1$ 488, and $IP_2$ 490 of FIG. 4.

Block 624 may be followed by optional block 626, "RANDOMIZE VIRTUAL MACHINE ADDRESSES", where the virtual machine addresses may be randomized to make unauthorized or malicious access by intruders even more difficult.

Optional block 626 may be followed by optional block 628, "PROVIDE QUASI-CORRECT RESULTS TO ZONE/INSTANCE SIZE REQUESTS", where an additional security mechanism may be employed by providing plausible but wrong cartographic results in response to zone or instance requests.

The blocks included in the above described process are for illustration purposes. Preventing cloud cartography in cloud-based datacenters may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 7:
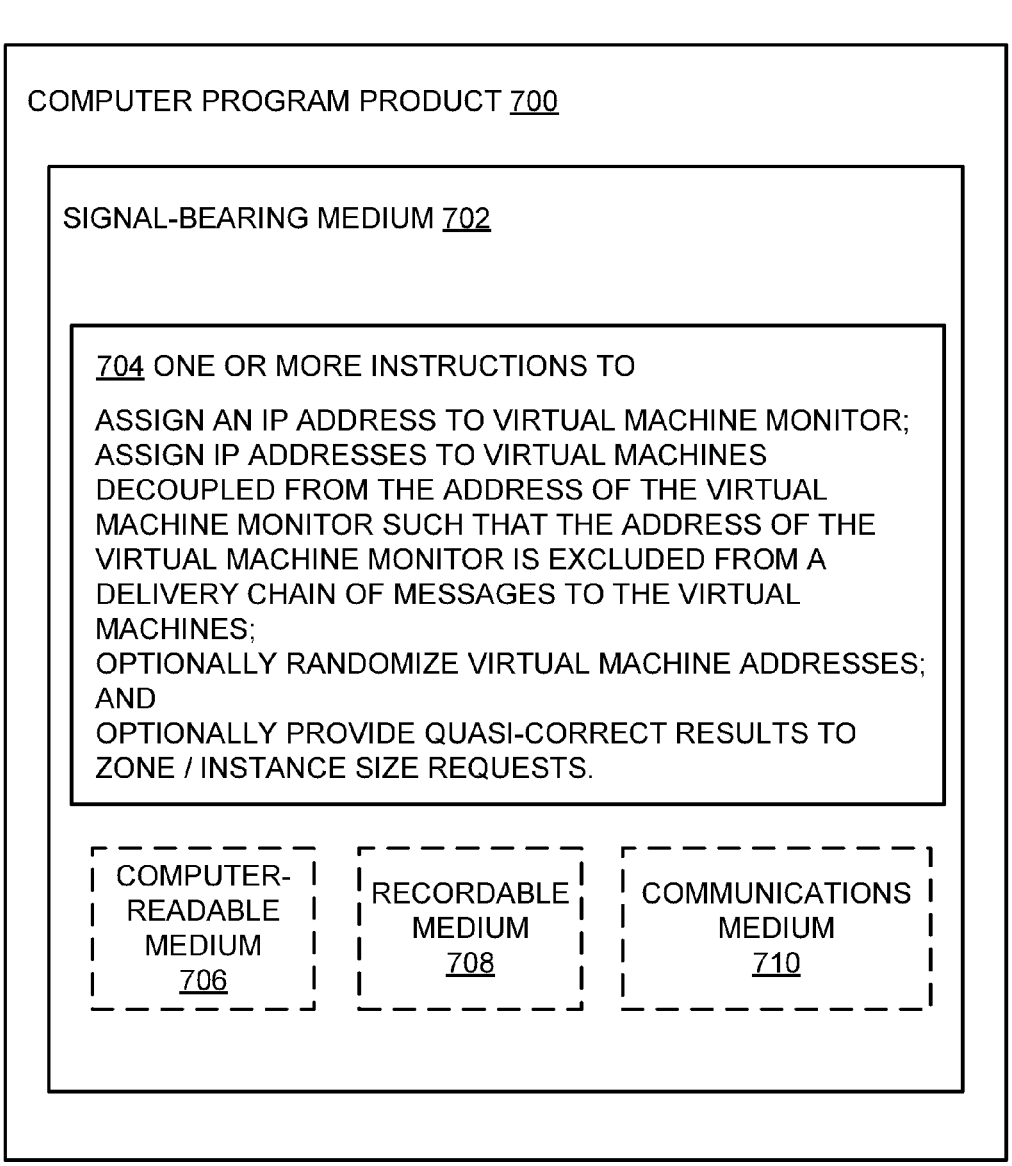
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the interface management module 526 may undertake one or more of the tasks shown in FIG. 7 in response to the instructions 704 conveyed to the processor 504 by the medium 702 to perform actions associated with preventing cloud cartography in cloud-based datacenters as described herein. Some of those instructions may include, for example, one or more instructions to assign an IP address to virtual machine monitor, assign IP address to virtual machines decoupled from the address of the virtual machine monitor such that the address of the virtual machine monitor is excluded from a delivery chain of messages to the virtual machines, optionally randomize virtual machine addresses, and optionally provide quasi-correct results to zone/instance size requests, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some example embodiments, a method for preventing cloud cartography in cloud-based datacenters may include providing access to a plurality of virtual machines operable to be executed on one or more physical machines within a datacenter through a virtual machine monitor and decoupling addresses of the plurality of virtual machines from an address of the virtual machine monitor such that the address of the virtual machine monitor is excluded from a delivery chain of messages to the plurality of virtual machines.

According to other examples, the addresses of the plurality of virtual machines and the address of the virtual machine monitor may be according to Internet Protocol (IP). The method may also include decoupling the addresses of the plurality of virtual machines from the address of the virtual machine monitor by adding a name space between an IP layer and transport protocols. The name space may include cryptographic identifiers, which may be distinct IP addresses for each virtual machine assigned within the datacenter according to Host Identity Protocol (HIP). The IP addresses may be transparent to an application external to the datacenter. Each IP address may be associated with a set of ports, security protocol, and one or more sessions for each virtual machine. Since incoming and outgoing traffic is transformed at the border gateway of the datacenter other forms of protocol, not necessarily standard, may be used to provide the distinct non-management IP addresses.

According to further examples, the method may further include assigning the IP addresses to the virtual machines in a random order, assigning an IP address to the virtual machine monitor from a dedicated range of IP addresses not accessible to external traffic, and/or assigning the IP addresses to the virtual machines in a random order upon creation of each virtual machine. The virtual machine monitor may be configured to pass messages to the virtual machines through a direct method avoiding a network hop between the virtual machine monitor and the virtual machines. The method may also include associating each customer account of the datacenter with a table linking random addresses to different zones and instance sizes such that an address is drawn from an appropriate population on a customer's table when the customer requests an instance fitting one of a zone and an instance size. The method may further include assigning each customer a distinct table such that an attacker receives positive false results for instance placement and co-residency determinations.

According to other example embodiments, a cloud-based datacenter configured to prevent cloud cartography may include a plurality of virtual machines operable to be executed on one or more physical machines, a virtual machine monitor configured to provide access to the plurality of virtual machines, and a datacenter controller configured to decouple addresses of the plurality of virtual machines from an address of the virtual machine monitor such that the address of the virtual machine monitor is excluded from a delivery chain of messages to the plurality of virtual machines.

According to some examples, the addresses of the plurality of virtual machines and the address of the virtual machine monitor may be according to Internet Protocol (IP). The datacenter controller may also decouple the addresses of the plurality of virtual machines from the address of the virtual machine monitor by adding a name space between an IP layer and transport protocols. The name space may include cryptographic identifiers, which may be distinct IP addresses for each virtual machine assigned within the datacenter according to Host Identity Protocol (HIP). The IP addresses may be transparent to an application external to the datacenter. Each IP address may be associated with a set of ports, security protocol, and one or more sessions for each virtual machine.

According to other examples, the datacenter controller may further assign the IP addresses to the virtual machines in a random order, assign an IP address to the virtual machine monitor from a dedicated range of IP addresses not accessible to external traffic, and/or assign the IP addresses to the virtual machines in a random order upon creation of each virtual machine. The virtual machine monitor may be configured to pass messages to the virtual machines through a direct method avoiding a network hop between the virtual machine monitor and the virtual machines. The datacenter controller may also associate each customer account of the datacenter with a table linking random addresses to different zones and instance sizes such that an address is drawn from an appropriate population on a customer's table when the customer requests an instance fitting one of a zone and an instance size.

According to yet other examples, the datacenter controller may assign each customer a distinct table such that an attacker receives positive false results for instance placement and co-residency determinations. The address for the virtual machine monitor may be dedicated to management communications. The virtual machine monitor may be further configured to intermediate access to physical machines and data storage. The datacenter may include a plurality of virtual machine monitors, each virtual machine monitor associated with a group of virtual machines and each virtual machine monitor assigned an address from a dedicated range of addresses not accessible to external traffic.

According to further example embodiments, a computer-readable storage medium may have instructions stored thereon for preventing cloud cartography in cloud-based datacenters. The instructions may include providing access to a plurality of virtual machines operable to be executed on one or more physical machines within a datacenter through a virtual machine monitor and decoupling addresses of the plurality of virtual machines from an address of the virtual machine monitor such that the address of the virtual machine monitor is excluded from a delivery chain of messages to the plurality of virtual machines.

According to some examples, the addresses of the plurality of virtual machines and the address of the virtual machine monitor may be according to Internet Protocol (IP). The instructions may also include decoupling the addresses of the plurality of virtual machines from the address of the virtual machine monitor by adding a name space between an IP layer and transport protocols. The name space may include cryptographic identifiers, which may be distinct IP addresses for each virtual machine assigned within the datacenter according to Host Identity Protocol (HIP). The IP addresses may be transparent to an application external to the datacenter. Each IP address may be associated with a set of ports, security protocol, and one or more sessions for each virtual machine.

According to other examples, the instructions may include assigning the IP addresses to the virtual machines in a random order, assigning an IP address to the virtual machine monitor from a dedicated range of IP addresses no accessible to external traffic, and/or assigning the IP addresses to the virtual machines in a random order upon creation of each virtual machine. The virtual machine monitor may be configured to pass messages to the virtual machines through a direct method avoiding a network hop between the virtual machine monitor and the virtual machines.

According to further examples, the virtual machine monitor may be configured to pass messages to the virtual machines through one or more paravirtualized network drivers. The instructions may also include associating each customer account of the datacenter with a table linking random addresses to different zones and instance sizes such that an address is drawn from an appropriate population on a customer's table when the customer requests an instance fitting one of a zone and an instance size. The instructions may further include assigning each customer a distinct table such that an attacker receives positive false results for instance placement and co-residency determinations.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g.,as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for preventing cloud cartography in cloud-based datacenters, the method comprising:
providing access to a plurality of virtual machines operable to be executed on one or more physical machines within a datacenter through a virtual machine monitor; and decoupling addresses of the plurality of virtual machines from an address of the virtual machine monitor such that the address of the virtual machine monitor is excluded from a delivery chain of messages to the plurality of virtual machines;

associating each customer account of the datacenter with a table linking random addresses to different zones and instance sizes such that an address is drawn from an appropriate population on a customer's table when the customer requests an instance fitting one of a zone and an instance size; and assigning each customer a distinct table such that an attacker receives positive false results for instance placement and co-residency determinations.

2. The method according to claim 1, wherein the addresses of the plurality of virtual machines and the address of the virtual machine monitor are according to Internet Protocol (IP).

3. The method according to claim 2, further comprising decoupling the addresses of the plurality of virtual machines from the address of the virtual machine monitor by adding a name space between an IP layer and transport protocols.

4. The method according to claim 3, wherein the name space includes cryptographic identifiers.

5. The method according to claim 4, wherein the cryptographic identifiers are distinct IP addresses for each virtual machine assigned within the datacenter according to Host Identity Protocol (HIP).

6. The method according to claim 5, wherein the IP addresses are transparent to an application external to the datacenter.

7. The method according to claim 5, wherein each IP address is associated with a set of ports, security protocol, and one or more sessions for each virtual machine.

8. The method according to claim 5, further comprising assigning the IP addresses to the virtual machines in a random order.

9. The method according to claim 5, further comprising:
assigning an IP address to the virtual machine monitor from a dedicated range of IP addresses not accessible to external traffic; and
assigning the IP addresses to the virtual machines in a random order upon creation of each virtual machine, wherein the virtual machine monitor is configured to pass messages to the virtual machines through a direct method avoiding a network hop between the virtual machine monitor and the virtual machines.

10. A cloud-based datacenter configured to prevent cloud cartography, the datacenter comprising:
a plurality of virtual machines operable to be executed on one or more physical machines;
a virtual machine monitor configured to provide access to the plurality of virtual machines;
a datacenter controller configured to:
decouple addresses of the plurality of virtual machines from an address of the virtual machine monitor such that the address of the virtual machine monitor is excluded from a delivery chain of messages to the plurality of virtual machines, wherein the addresses of the plurality of virtual machines and the address of the virtual machine monitor are according to Internet Protocol (IP);
associate each customer account of the datacenter with a table linking random addresses to different zones and instance sizes such that an address is drawn from an appropriate population on a customer's table when the customer requests an instance fitting one of a zone and an instance size; and
assign each customer a distinct table such that an attacker receives positive false results for instance placement and co-residency determinations.

11. The datacenter according to claim 10, wherein the addresses of the plurality of virtual machines and the address of the virtual machine monitor are according to Internet Protocol (IP), and the datacenter controller is further configured to decouple the addresses of the plurality of virtual machines from the address of the virtual machine monitor by adding a name space between an IP layer and transport protocols.

12. The datacenter according to claim 11, wherein the datacenter controller is further configured to:
assign an IP address to the virtual machine monitor from a dedicated range of IP addresses not accessible to external traffic; and
assign the IP addresses to the virtual machines in a random order upon creation of each virtual machine.

13. The datacenter according to claim 10, wherein the virtual machine monitor is configured to pass messages to the virtual machines through a direct method avoiding a network hop between the virtual machine monitor and the virtual machines.

14. The datacenter according to claim 10, wherein the address for the virtual machine monitor is dedicated to management communications.

15. The datacenter according to claim 10, wherein the virtual machine monitor is further configured to intermediate access to physical machines and data storage.

16. The datacenter according to claim 10, wherein the datacenter includes a plurality of virtual machine monitors, each virtual machine monitor associated with a group of virtual machines and each virtual machine monitor assigned an address from a dedicated range of addresses not accessible to external traffic.

17. A non-transitory computer-readable storage medium having instructions stored thereon for preventing cloud cartography in cloud-based datacenters, the instructions comprising:
providing access to a plurality of virtual machines operable to be executed on one or more physical machines within a datacenter through a virtual machine monitor; and
decoupling addresses of the plurality of virtual machines from an address of the virtual machine monitor such that the address of the virtual machine monitor is excluded from a delivery chain of messages to the plurality of virtual machines;
associating each customer account of the datacenter with a table linking random addresses to different zones and instance sizes such that an address is drawn from an appropriate population on a customer's table when the customer requests an instance fitting one of a zone and an instance size; and
assigning each customer a distinct table such that an attacker receives positive false results for instance placement and co-residency determinations.

18. The non-transitory computer-readable storage medium according to claim 17, wherein the virtual machine monitor is configured to pass messages to the virtual machines through a direct method avoiding a network hop between the virtual machine monitor and the virtual machines.

19. The non-transitory computer-readable storage medium according to claim 18, wherein the virtual machine monitor is configured to pass messages to the virtual machines through one or more paravirtualized network drivers.

* * * * *

UNITED STATES PATENT AND TRADEMARK OFFICE
CERTIFICATE OF CORRECTION

PATENT NO. : 9,207,963 B2
APPLICATION NO. : 13/634448
DATED : December 8, 2015
INVENTOR(S) : Kruglick Page 1 of 1

It is certified that error appears in the above-identified patent and that said Letters Patent is hereby corrected as shown below:

In the specification,

In Column 1, Line 7, delete "§371" and insert -- § 371 --, therefor.

In Column 2, Line 55, delete "hereof In" and insert -- hereof. In --, therefor.

In Column 7, Line 19, delete "thereof Examples" and insert -- thereof. Examples --, therefor.

In Column 14, Line 41, delete "thereof" and insert -- thereof. --, therefor.

Signed and Sealed this
Fifth Day of April, 2016

Michelle K. Lee
*Director of the United States Patent and Trademark Office*